(12) United States Patent
Konishi et al.

(10) Patent No.: US 9,117,590 B2
(45) Date of Patent: Aug. 25, 2015

(54) LAMINATED CERAMIC ELECTRONIC COMPONENT (71) Applicant: TAIYO YUDEN CO., LTD., Taito-ku, Tokyo (JP)

(72) Inventors: Yukihiro Konishi, Takasaki (JP); Yusuke Kowase, Takasaki (JP); Kazumichi Hiroi, Takasaki (JP); Kotaro Mizuno, Takasaki (JP); Ayumu Sato, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 185 days.

(21) Appl. No.: 13/921,744

(22) Filed: Jun. 19, 2013

(65) Prior Publication Data

US 2013/0342956 A1 Dec. 26, 2013

(30) Foreign Application Priority Data

Jun. 21, 2012 (JP) .................................. 2012-139800

(51) Int. Cl.
*H01G 4/06* (2006.01)
*H01G 4/005* (2006.01)
*H01G 4/12* (2006.01)
*H01G 4/30* (2006.01)
*H01G 4/008* (2006.01)

(52) U.S. Cl.
CPC ............. *H01G 4/005* (2013.01); *H01G 4/0085* (2013.01); *H01G 4/12* (2013.01); *H01G 4/30* (2013.01)

(58) Field of Classification Search
USPC ........... 361/321.1, 321.2, 303, 305, 311–313, 361/306.1, 306.3
See application file for complete search history.

(56) References Cited

U.S. PATENT DOCUMENTS

2004/0207296 A1* 10/2004 Namerikawa et al. ........ 310/367
2010/0141099 A1* 6/2010 Suenaga et al. ............... 310/365

FOREIGN PATENT DOCUMENTS

| JP | 2003-178926 A | 6/2003 |
| JP | 2004-342744 A | 12/2004 |
| JP | 2007-173714 A | 7/2007 |

OTHER PUBLICATIONS

A Notice of Reasons for Refusal issued by Japanese Patent Office, mailed Feb. 4, 2014, for Japanese counterpart application No. 2012-139800.

* cited by examiner

*Primary Examiner* — Nguyen T Ha
(74) *Attorney, Agent, or Firm* — Law Office of Katsuhiro Arai (57) ABSTRACT

A laminated ceramic electronic component has electrode layers stacked with ceramic layers, where the thickness of each electrode layer is controlled to 0.5 μm or less and the average size of crystal grains constituting the electrode layer is controlled to 0.1 μm or less. The occurrence of structural defects in the laminated ceramic electronic component can be suppressed and high continuity of the electrode layers stacked with the ceramic layers is ensured.

10 Claims, 6 Drawing Sheets

Ni crystal grain size (nm)

Layer thickness ratio Te/Td

Fig. 7

Top: Electrode thickness Te (nm)
Bottom: Dielectrics thickness Td (nm)

LAMINATED CERAMIC ELECTRONIC COMPONENT

BACKGROUND

1. Field of the Invention

The present invention relates to a laminated ceramic electronic component with internal electrodes. Specifically, the present invention relates to a multilayer ceramic capacitor (MLCC) that has been reduced in size and increased in capacity by providing the internal electrodes as thin layers and stacking them densely.

2. Description of the Related Art

As mobile phones and other digital electronic devices become increasingly smaller and thinner, laminated ceramic electronic components that are surface-mounted on electronic circuit boards, etc., are getting smaller. In particular, multilayer ceramic capacitors that are laminated ceramic electronic components are seeing growing needs every year for capacity increase to support decreasing chip sizes. Multilayer ceramic capacitors have a structure whereby dielectric ceramic layers and internal electrode layers are stacked alternately.

In general, reducing the capacitor size inevitably reduces the area of the electrode layers facing the dielectric layers and therefore decreases the capacitance. Accordingly, it is essential, in ensuring enough capacitance of the capacitor to support decreasing chip sizes, to make the dielectric layers and electrode layers thinner and incorporate technology to densely stack them in multiple layers. In particular, the capacity of the capacitor is not affected by the thickness of the electrode layers and therefore it is desirable to make the electrode layers as thin as possible in order to reduce the chip size.

With a ceramic capacitor of densely stacked layers, however, there is a problem in that the thinner the internal electrode layers, the smaller the coverage becomes and the incidence of structural defects rises as a result. Additionally, a decrease of reliability, such as an increase of the probability of shorting of the multilayer ceramic capacitor, also tends to occur.

Prior art is already known that attempts to improve the coverage of a multilayer ceramic capacitor (refer to Patent Literature 1, for example). According to Patent Literature 1, occurrence of structural defects can be suppressed with a multilayer ceramic capacitor whose dielectric layers are 3 µm or thinner and whose internal electrode layers are 0.5 µm to 1.5 µm thick, by adjusting the average size of nickel crystal, which is the primary component of the internal electrode layer, to a range of 0.1 µm or more and 1.5 µm or less.

In addition, Patent Literature 2 discloses another prior art claiming that, by adjusting the average line roughness at the center of the interface between the dielectric layer and internal electrode layer to a range of 20 nm or more and 100 nm or less, a multilayer ceramic capacitor exhibiting excellent longevity under high-temperature load can be achieved.

DESCRIPTION OF THE RELATED ART

Patent Literatures

[Patent Literature 1] Japanese Patent Laid-open No. 2004-342744

[Patent Literature 2] Japanese Patent Laid-open No. 2007-173714

SUMMARY

Recent years have seen a demand for multilayer ceramic capacitors that are even smaller in size and larger in capacity, thereby giving rise to a need for ensuring reliable multilayer ceramic capacitors that can be put to practical use even when their dielectric layers and internal electrode layers are made thinner to 1 µm or less and 0.5 µm or less in thickness, respectively.

The present invention was made to solve the aforementioned problems and it is an object of the present invention to provide a laminated ceramic electronic component or multilayer ceramic capacitor that offers high reliability despite smaller size and higher density.

To solve the aforementioned problems, the present invention provides a laminated ceramic electronic component having ceramic layers and electrode layers that are stacked with the ceramic layers, wherein the laminated ceramic electronic component is such that the electrode layers are 0.5 µm or less in thickness and the average crystal grain size in the electrode layer is 0.1 µm or less.

With the aforementioned laminated ceramic electronic component, preferably the surface roughness based on the maximum height of the interface between the ceramic layer and electrode layer is one-third the thickness of the electrode layer or less. In addition, more preferably the surface roughness based on the maximum height of this interface is one-fourth the thickness of the electrode layer or less.

With the aforementioned laminated ceramic electronic component, preferably the thickness of the electrode layer is one-half the thickness of the ceramic layer or less. In addition, more preferably the thickness of the electrode layer is one-third the thickness of the ceramic layer or less.

With the aforementioned laminated ceramic electronic component, preferably the thickness of the electrode layer is 0.5 µm or less and 0.4 µm or more.

In addition, the present invention provides a multilayer ceramic capacitor constituted by stacking dielectric layers constituted by the aforementioned ceramic layers alternately with the aforementioned electrode layers.

According to the present invention, a highly reliable laminated ceramic electronic component can be provided that suppresses occurrence of structural defects despite smaller size and higher density and also has electrode layers of high coverage, among others. Furthermore, a multilayer ceramic capacitor comprising dielectric layers and internal electrode layers densely stacked together can achieve high capacity and high reliability at the same time.

Any discussion of problems and solutions involved in the related art has been included in this disclosure solely for the purposes of providing a context for the present invention, and should not be taken as an admission that any or all of the discussion were known at the time the invention was made.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

| Description of the Symbols | |
|---|---|
| 1 | Multilayer ceramic capacitor |
| 10 | Sintered compact |
| 12 | Dielectric ceramic layer |
| 13 | Internal electrode layer |
| 15 | Cover layer |
| 20 | External electrode |

DETAILED DESCRIPTION OF EMBODIMENTS

Figure 1:
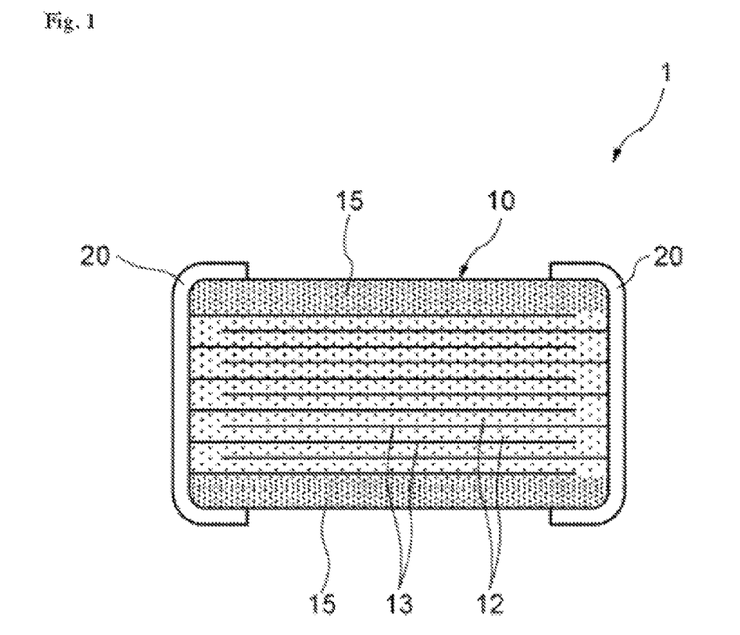
FIG. 1 is a section view showing the rough structure of the multilayer ceramic capacitor in an embodiment of the present invention.

As an embodiment of a laminated ceramic electronic component, a multilayer ceramic capacitor that has been reduced in size and increased in capacity is illustrated. FIG. 1 is a longitudinal section view showing the rough structure of a multilayer ceramic capacitor 1 according to an embodiment of the present invention. The multilayer ceramic capacitor 1 basically comprises a sintered compact 10 having standardized chip dimensions and shape (such as a rectangular solid of 1.0 mm×0.5 mm×0.5 mm), as well as a pair of external electrodes 20, 20 formed on both sides of the sintered compact 10. The sintered compact 10 comprises dielectric ceramic layers 12 as ceramic layers and internal electrode layers 13 as electrode layers which are stacked alternately, and cover layers 15 are formed as the outermost layers of the foregoing. The dielectric ceramic layer 12 and cover layer 15 have BaTiO$_3$ (barium titanate, sometimes abbreviated as "BT") as their primary component to be sintered, for example, while the internal electrode layer 13 has Ni (nickel) as its primary component to be sintered.

The sintered compact 10 has a high-density, multilayer structure where the thickness of one dielectric ceramic layer 12 sandwiched by two internal electrode layers 13 is 1 μm or less, thickness of the internal electrode layer 13 is 0.5 μm or less, and the overall number of layers is in a range of several hundreds, according to the specifications of capacitance, ability to withstand pressure, etc., required of the capacitor. The cover layers 15 formed as the outermost layers of the sintered compact 10 are provided to protect the dielectric ceramic layers 12 and internal electrode layers 13 against contamination by moisture, contaminants, etc., present on the outside and thereby prevent aging of these layers.

The multilayer ceramic capacitor 1 is manufactured by the following steps, for example. First, fine powder whose primary component is BaTiO$_3$ is wet-mixed with additive compounds and then dried and pulverized to prepare dielectric material powder. Trace amounts of metal oxides containing Mg (magnesium), Mn (manganese) or certain rare earth elements (such as Y (yttrium), Ho (holmium), etc.) can be added to the dielectric material powder as reduction suppressants, for example. The prepared dielectric material powder is wet-mixed with polyvinyl acetal resin and organic solvent, after which the mixture is coated on belt-shaped dielectric green sheets of 1 μm or less using the doctor blade method, for example, and dried. Then, conductive paste containing organic binder is screen-printed onto the surfaces of dielectric green sheets to put in place patterns for internal electrode layers 13. For the metal powder of conductive paste, Ni, Co (cobalt), Cu (copper), etc., can be used, for example, but Ni is a favorable choice when cost, oxidation resistance, etc., are considered. It is also possible to uniformly disperse, as common material, dielectric material powder (such as BaTiO$_3$) with a grain size of 50 nm or less. This is to let the co-material prevent contact between metal powders and thereby suppress crystal growth. In addition, conductive paste made by compounding the primary component of Ni with Mg or Cr (chromium) can be used, as well.

Preferably the average grain size of the dielectric material powder whose primary component is BaTiO$_3$ is 0.10 μm to 0.20 μm. In addition, preferably the thickness of the conductive paste printed on the dielectric green sheet is adjusted in such a way that the thickness of the sintered internal electrode layer 13 becomes approx. 0.3 μm to 0.5 μm.

Thereafter, the specified number of dielectric green sheets that have been stamped and adjusted to a size of 15 cm×15 cm, for example, are stacked alternately with the internal electrode layers 13. Cover sheets that provide the cover layers 15 are then pressure-welded on top and bottom of the stacked dielectric green sheets and the obtained laminate is cut to the specified chip dimensions (such as 1.0 mm×0.5 mm), after which conducive paste is applied on both sides of the laminate and then dried to form external electrodes 20, 20. This way, a compact for a multilayer ceramic capacitor 1 is obtained.

The thus-obtained molding is put in a N$_2$ ambience of approx. 350° C. to remove the binder, and then sintered for 10 minutes to 2 hours at 1140 to 1260° C. under a mixed reducing gas containing N$_2$, H$_2$ and H$_2$O (where the partial oxygen pressure is approx. $1.0 \times 10^{-11}$ MPa). Then, the sintered molding is put in a N$_2$ ambience of approx. 1000° C. to oxidize the dielectrics, to obtain a multilayer ceramic capacitor 1 whose dielectric grains constituting the dielectric ceramic layers have been grown to a desired grain size (referring to the dielectric grain size after sintering).

The multilayer ceramic capacitor 1 obtained by sintering based on the conditions specified above has internal electrode layers 13 whose thickness is 0.5 μm or less and the average crystal grain size in these layers is 0.1 μm or less. Additionally, a more preferable average crystal grain size in the internal electrode layer 13 is 0.08 μm or less.

The crystal grain size in the internal electrode layer 13 can be measured according to a micrograph of a partial cross section of the sintered compact 10 taken by a scanning electron microscope (SEM), for example. Before observing with the SEM, the multilayer ceramic capacitor 1 is cut by the ion million method, for example, to obtain a smooth section suitable for SEM observation. In addition, thermal etching can be provided beforehand in the same ambience used in the sintering step (mixed gas containing N$_2$, H$_2$ and H$_2$O) in order to capture the grain boundary clearly.

Figure 2:
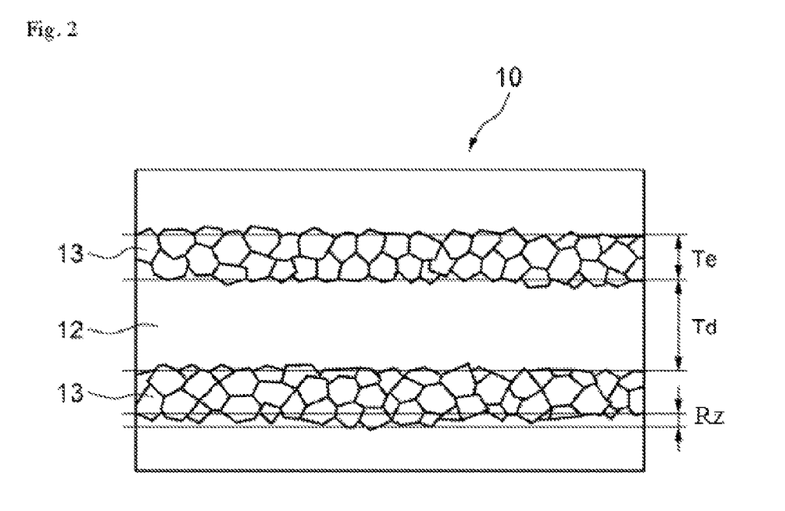
FIG. 2 is a section view schematically showing the layer structure of dielectric ceramic layers and internal electrode layers.

FIG. 2 is a section view schematically showing the layer structure of dielectric ceramic layers 12 and internal electrode layers 13 in the multilayer ceramic capacitor 1. The crystal grain boundary (not illustrated) of the internal electrode layer 13 can be observed based on the contrast difference resulting from different crystal orientations as captured on the electron micrograph. Crystal growth in the internal electrode layer 13 that results from sintering is not uniform due to the effect of internal stress that generates as this layer is sandwiched between dielectric ceramic layers 12 on top and bottom. Accordingly, it is preferable, for the purpose of evaluating the crystal grain size in the internal electrode layer 13, to measure the crystal width at two locations at least, each having a different orientation, and then obtain the average. The thickness Td of the dielectric ceramic layer 12, thickness Te of the internal electrode layer 13, and surface roughness Rz of the interface between the dielectric ceramic layer 12 and internal electrode layer 13, which are explained below, are also measured based on a SEM micrograph capturing a section of the sintered compact 10.

In addition, preferably the surface roughness Rz based on the maximum height of the interface between the dielectric ceramic layer 12 and internal electrode layer 13 after sintering is one-third the thickness Te of the internal electrode layer 13 or less. More preferably the surface roughness Rz based on the maximum height is one-fourth the thickness Te of the internal electrode layer 13 or less.

The surface roughness Rz of the interface between the dielectric ceramic layer 12 and internal electrode layer 13 can be measured by capturing a section of the sintered compact 10 as mentioned above and then conducting image analysis of the SEM micrograph to obtain the maximum height of surface irregularity of the section With the multilayer ceramic capacitor 1, preferably the thickness Te of the internal electrode layer 13 after sintering is one-half the thickness Td of the dielectric ceramic layer 12 or less. More preferably the thickness Te of the internal electrode layer 13 is one-third the thickness Td of the dielectric ceramic layer 12 or less.

Additionally, with the multilayer ceramic capacitor 1, preferably the thickness Te of the internal electrode layer 13 after sintering is 0.5 μm or less and 0.3 μm or more. A more preferable thickness Te of the internal electrode layer 13 is 0.5 μm or less and 0.4 μm or more.

It was found that, according to these embodiments, a multilayer ceramic capacitor 1 whose internal electrode layers 13 are 0.5 μm or thinner can achieve high reliability characterized by 80% or higher modulus of continuity relating to the coverage of internal electrode layers 13 (modulus of internal electrode layer continuity) and 10% or lower probability of shorting relating to electrical resistance.

Figure 3:
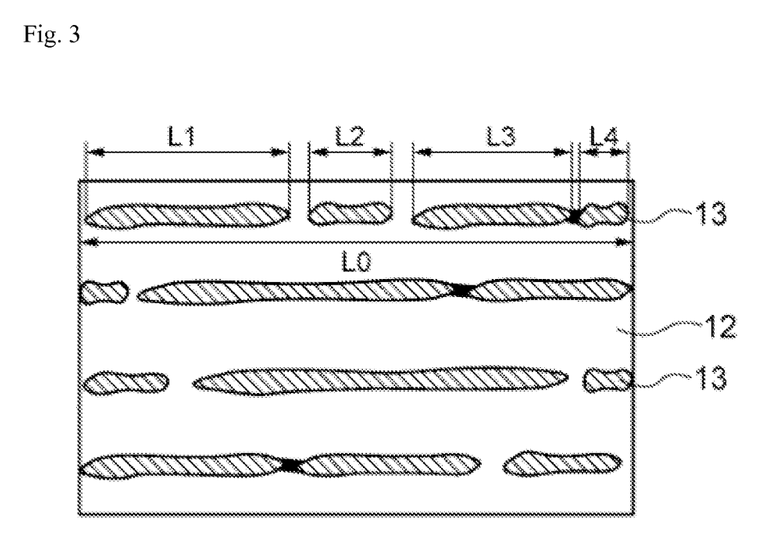
FIG. 3 is a section view used to explain the modulus of continuity of internal electrode layers.

Here, a parameter called the modulus of continuity of sections of internal electrode layers 13 in the stacking direction (modulus of internal electrode layer continuity) was introduced so that coverage of internal electrode layers 13 in the multilayer ceramic capacitor 1 can be evaluated in a simple, accurate manner. As shown in FIG. 3, lengths of metal parts L1, L2, . . . , Ln can be measured in the observation area of length L0 of a given internal electrode layer 13 and the measured lengths added up to obtain $\Sigma$ Ln/L0, which represents the ratio of metal parts, as the modulus of continuity of the applicable layer. In addition, the probability of shorting, which is the other parameter for reliability evaluation, is defined as the ratio obtained by applying 1 VDC of voltage to the external electrodes 20, 20 of multilayer ceramic capacitor samples and then dividing the number of samples whose electrical resistance between the external electrodes was below 1 k$\Omega$ by the total number of samples tested.

EXAMPLE

Next, an example of a multilayer ceramic capacitor (hereinafter referred to as "MLCC") that was constituted by stacking dielectric layers constituted by ceramic layers alternately with internal electrode layers is explained as a laminated ceramic electronic component pertaining to the present invention.

<MLCC Samples>

$BaTiO_3$ with an average grain size of 0.1 μm to 0.2 μm was used as the material powder for a dielectric, and Ni with an average grain size of 0.05 μm to 0.15 μm was used as the metal powder for internal electrodes. Stacked green sheets were sintered under different temperature conditions to produce multiple MLCC samples having dielectric ceramic layers (hereinafter referred to simply as "dielectric layers") of 0.6 μm to 1.0 μm in thickness as well as internal electrode layers of 0.3 μm to 0.5 μm in thickness. The chip dimensions of produced MLCCs were all 1.0 mm×0.5 mm×0.5 mm (size 1005), and the number of layers was 100.

<Evaluation Method>

(1) Measurement of thickness Td of Dielectric Layer and Thickness Te of Internal Electrode Layer The center of the MLCC sample was cut along the surface in the stacking direction according to the ion milling method and the section was captured with a scanning electron microscope (SEM), and the obtained micrograph was used to measure the thickness Td of the dielectric layer and thickness Te of the internal electrode layer by means of image analysis. The section was captured in such a way that the viewing angle of the SEM micrograph would become a 10-μm square, and then the thickness of the dielectric layer was measured at multiple random locations at intervals of 3 μm or equivalent, and the average of measured thicknesses was used as the thickness Td of the dielectric layer. Similarly, the thickness of the internal electrode layer was measured at multiple random locations on the SEM micrograph at intervals of 3 μm or equivalent and the average of measured thicknesses was used as the thickness Te of the internal electrode layer. To obtain the average thicknesses of these layers, sample values were measured at 20 random locations at least.

(2) Measurement of Crystal Grain Size of Internal Electrode Layer

Using the same method for layer thickness measurement mentioned above, the crystal grain size of the internal electrode layer was measured by image analysis based on a SEM micrograph capturing a section of the MLCC sample in the stacking direction. Since the SEM would produce contrast difference due to different crystal orientations in the internal electrode layer, the actual crystal grain boundary was observed based on the contrast difference. As for the grain size of each individual crystal, the maximum width of the crystal grain boundary was measured at two locations in the stacking direction (vertical width) and direction crossing at right angles with the stacking direction (horizontal width), and their average was used for evaluation as the crystal grain diameter. The average crystal grain sizes shown in Tables 1 to 3 provided later represent averages of sample grain diameters measured for at least 500 randomly selected crystals in the internal electrode layer captured on the SEM micrograph.

(3) Measurement of Surface Roughness Rz of Interface Between Dielectric Layer and Internal Electrode Layer The surface roughness Rz of the interface between the dielectric layer and internal electrode layer (also referred to as "interface roughness") was evaluated by image analysis of a micrograph captured with a SEM showing a section of the MLCC sample in the stacking direction. The boundary line between the dielectric layer and internal electrode layer captured on the SEM micrograph was defined as the roughness curve, and the maximum height between the peak and trough of the boundary line captured in the viewing angle area of 10-μm square was measured. Similar measurement was performed at 20 random locations at least and their average was used as the surface roughness Rz (unit: nm).

(4) Evaluation of Modulus of Continuity of Internal Electrode Layers

The chip of the MLCC sample was embedded in resin and fixed and then ground in this condition to expose the section in the stacking direction, after which the section was captured at a magnification of 5000 to 1000 times using an optical microscope and the image was used to measure the modulus of continuity of internal electrode layers. The moduli of continuity shown in Tables 1 to 3 represent averages of moduli of continuity measured for at least 30 randomly selected layers in the MLCC sample.

The closer the modulus of continuity of internal electrode layers to 100%, the closer the coverage approaches 100% and the product reliability increases as a result. For the specified value of modulus of continuity, a modulus of continuity of 80% or higher, at which the capacitance will not drop, was evaluated as acceptable.

(5) Evaluation of Probability of Shorting

1 VDC of voltage was applied between the external electrodes of MLCC samples and the ratio calculated by dividing the number of samples whose insulation resistance was less than 1 kΩ by the total number of samples tested, was evaluated as the probability of shorting. Tables 1 to 3 provided later show the probabilities of shorting measured on at least 100 randomly selected MLCCs under the respective conditions (Condition Nos. 1 to 18).

Increase in the probability of shorting leads to greater vulnerability of the MLCC product in terms of current leakage and voltage resistance. Here, a probability of shorting of 10% or lower was considered acceptable (specified range) for a MLCC sample comprising 100 layers. Incidentally, statistics show that, as long as the quality is such that the probability of shorting of a MLCC comprising 100 layers is 10% or lower, the probability of shorting of a MLCC comprising 400 layers or so, which corresponds to a product level, becomes 35% or lower. At a probability of shorting in this range, the required product yield (at least 50%) can be achieved sufficiently.

(6) Evaluation of Incidence of Structural Defects

The chip of the MLCC sample was embedded in resin and fixed and then ground in this condition along the stacking direction to expose a section of the dielectric layer and internal electrode layer, after which the section was visually inspected or enlarged and captured with an optical microscope. The ratio calculated by dividing the number of samples having cracks or delamination (inter-layer separation) on the observed section, by the total number of samples inspected, was evaluated as the incidence of structural defects. Tables 1 to 3 show the incidences of structural defects evaluated for at least 100 randomly selected MLCCs under the respective conditions (Condition Nos. 1 to 18). It should be noted that desirably the incidence of structural defects remains below 1% at the maximum.

<Evaluation Results>

The evaluation results of MLCC samples produced under the respective conditions are explained by referring to Tables 1 to 3.

(1) Condition Nos. 1 to 4

Table 1 shows the evaluation results of samples whose thickness Te of the internal electrode layer was 0.50 μm and whose average crystal grain size in the internal electrode layer varied in a range of 0.08 μm to 0.20 μm (Condition Nos. 1 to 4). The MLCCs of Condition Nos. 1 to 4 were samples produced by using dielectric material powder with an average grain size of 0.10 μm and adjusting the thickness Td of the dielectric layer to 1.00 μm.

TABLE 1

| | B | | E | | H | I | J | | | |
|---|---|---|---|---|---|---|---|---|---|---|
| A | C (μm) | D (μm) | F (μm) | G (μm) | Rz (nm) | Te/Td (—) | Rz/Te (—) | K (%) | L (%) | M (%) |
| 1 | 0.10 | 1.00 | 0.08 | 0.50 | 108 | 0.50 | 0.22 | 97 | 2 | 0 |
| 2 | 0.10 | 1.00 | 0.10 | 0.50 | 120 | 0.50 | 0.24 | 92 | 3 | 0 |
| *3 | 0.10 | 1.00 | 0.15 | 0.50 | 150 | 0.50 | 0.30 | 78 | 14 | 0 |
| *4 | 0.10 | 1.00 | 0.20 | 0.50 | 180 | 0.50 | 0.36 | 69 | 26 | 0 |

A: Condition No.;
B: Dielectric layer (BT);
C: Average grain size of powder;
D: Thickness Td;
E: Internal electrode layer (Ni);
F: Average crystal grain size;
G: Thickness Te;
H: Interface roughness;
I: Layer thickness ratio;
J: Roughness ratio;
K: Coverage as modules of continuity;
L: Electrical resistance as probability of shorting;
M: Incidence of structural defects
*indicates a condition producing a result outside the specified range (reference example).

The samples of Condition Nos. 1 and 2 whose average crystal grain size in the internal electrode layer was 0.10 μm or less had a modulus of continuity relating to coverage of 80% or higher and probability of shorting relating to electrical resistance of 10% or lower. They also did not have cracks or other structural defects observed on them, and were therefore judged favorable in terms of reliability required of a MLCC product.

The sample of Condition No. 3 whose average crystal grain size in the internal electrode layer was 0.15 μm had a modulus of continuity of 78% and probability of shorting of 14%, both being outside the specified ranges. The sample of Condition No. 4 whose crystal grain size in the internal electrode layer was 0.20 μm had a modulus of continuity of 69% and probability of shorting of 26%, indicating a lower evaluation of reliability.

Figure 4:
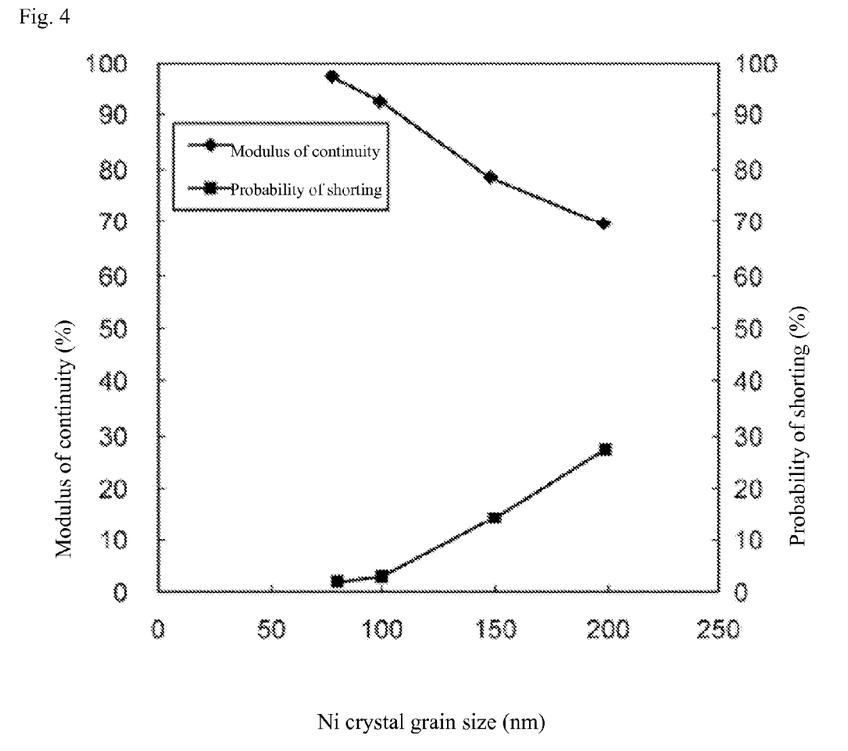
FIG. 4 is a graph showing the relationships of crystal grain size, modulus of continuity of internal electrodes and probability of shorting.

The results in Table 1 confirm that the average crystal grain size in the internal electrode layer must be 0.10 μm or less at least in order to achieve a good modulus of continuity and probability of shorting with a MLCC whose thickness Td of the dielectric layer was 1.0 μm and thickness Te of the internal electrode layer was 0.5 μm (refer to Condition Nos. 1 and 2). FIG. 4 provides a graph showing the relationships of average crystal grain size in the internal electrode, modulus of continuity, and probability of shorting, based on the results obtained in Table 1.

(2) Condition Nos. 5 to 12

Table 2 shows the evaluation results of samples whose average crystal grain size in the internal electrode layer was constant at 0.10 μm, average grain size of dielectric material powder varied in a range of 0.10 μm to 0.20 μm, and thickness Te of the internal electrode layer varied in a range of 0.30 μm to 0.50 μm (Condition Nos. 2 and 5 to 12). The thickness Td of the dielectric layer was constant at 1.00 μm under all of Condition Nos. 2 and 5 to 12.

other structural defects observed on them under such condition. The sample of Condition No. 2 whose interface roughness ratio (Rz/Te) was 0.24 also produced the specified result as mentioned above, indicating good reliability. The samples of Condition Nos. 2 and 11, which were judged good, both had an interface roughness Rz of the internal electrode layer corresponding to one-third the thickness Te or less (in other words, the roughness ratio (Rz/Te) was 0.33 or less).

In Table 2, the samples of Condition Nos. 5 to 7 whose thickness Te of the internal electrode layer was 0.30 μm all represent examples where the interface roughness Rz of the internal electrode layer is greater than one-third the thickness Te of the internal electrode layer. With respect to the modulus of continuity, all of them failed to meet the specified value of 80% or higher.

The samples of Condition Nos. 8 to 10 whose thickness Te of the internal electrode layer was 0.40 μm also represent examples where the interface roughness Rz of the internal electrode layer was greater than one-third the thickness Te of the internal electrode layer. Of these, the samples of Condition Nos. 9 and 10 had a modulus of continuity lower than 80%, being outside the specified range. Additionally, the sample of Condition No. 10 had a probability of shorting of 16%, failing to meet the specified value of 10% or lower.

TABLE 2

|   | B | | E | | H | I | J | | | |
|---|---|---|---|---|---|---|---|---|---|---|
| A | C (μm) | D (μm) | F (μm) | G (μm) | Rz (nm) | Te/Td (—) | Rz/Te (—) | K (%) | L (%) | M (%) |
| *5 | 0.10 | 1.00 | 0.10 | 0.30 | 160 | 0.30 | 0.53 | 67 | 2 | 0 |
| *6 | 0.15 | 1.00 | 0.10 | 0.30 | 190 | 0.30 | 0.63 | 60 | 5 | 0 |
| *7 | 0.20 | 1.00 | 0.10 | 0.30 | 220 | 0.30 | 0.73 | 54 | 9 | 0 |
| *8 | 0.10 | 1.00 | 0.10 | 0.40 | 135 | 0.40 | 0.34 | 80 | 4 | 0 |
| *9 | 0.15 | 1.00 | 0.10 | 0.40 | 165 | 0.40 | 0.41 | 70 | 9 | 0 |
| *10 | 0.20 | 1.00 | 0.10 | 0.40 | 195 | 0.40 | 0.49 | 63 | 16 | 0 |
| 2 | 0.10 | 1.00 | 0.10 | 0.50 | 120 | 0.50 | 0.24 | 92 | 3 | 0 |
| 11 | 0.15 | 1.00 | 0.10 | 0.50 | 150 | 0.50 | 0.30 | 82 | 9 | 0 |
| *12 | 0.20 | 1.00 | 0.10 | 0.50 | 180 | 0.50 | 0.36 | 69 | 26 | 0 |

A: Condition No.;
B: Dielectric layer (BT);
C: Average grain size of powder;
D: Thickness Td;
E: Internal electrode layer (Ni);
F: Average crystal grain size;
G: Thickness Te;
H: Interface roughness;
I: Layer thickness ratio;
J: Roughness ratio;
K: Coverage as modules of continuity;
L: Electrical resistance as probability of shorting;
M: Incidence of structural defects
*indicates a condition producing a result outside the specified range (reference example).

Table 2 shows the results of attempting to evaluate the reliability of MLCCs by focusing on the interface roughness Rz of the internal electrode layer. Here, Condition Nos. 5 to 7, Condition Nos. 8 to 10, and Condition Nos. 2, 11, and 12 cannot be simply compared in terms of interface roughness Rz because the thicknesses Te of the internal electrode layer were different. Accordingly, the interface roughness Rz of the internal electrode layer was normalized by the thickness Te of the internal electrode layer and the relationships of the resulting roughness ratio (Rz/Te) and reliability-related parameters (modulus of continuity and probability of shorting) were examined.

The sample of Condition No. 11 whose roughness ratio (Rz/Te) of the interface of the internal electrode layer is 0.30 had a modulus of continuity of 80% or higher and probability of shorting of 10% or lower. It also did not have cracks or Among the samples of Condition Nos. 2, 11, and 12, whose thickness Te of the internal electrode layer is 0.50 μm, the sample of Condition No. 12 whose interface roughness Rz was greater than one-third the thickness Te failed to meet the specified modulus of continuity and probability of shorting.

Figure 5:
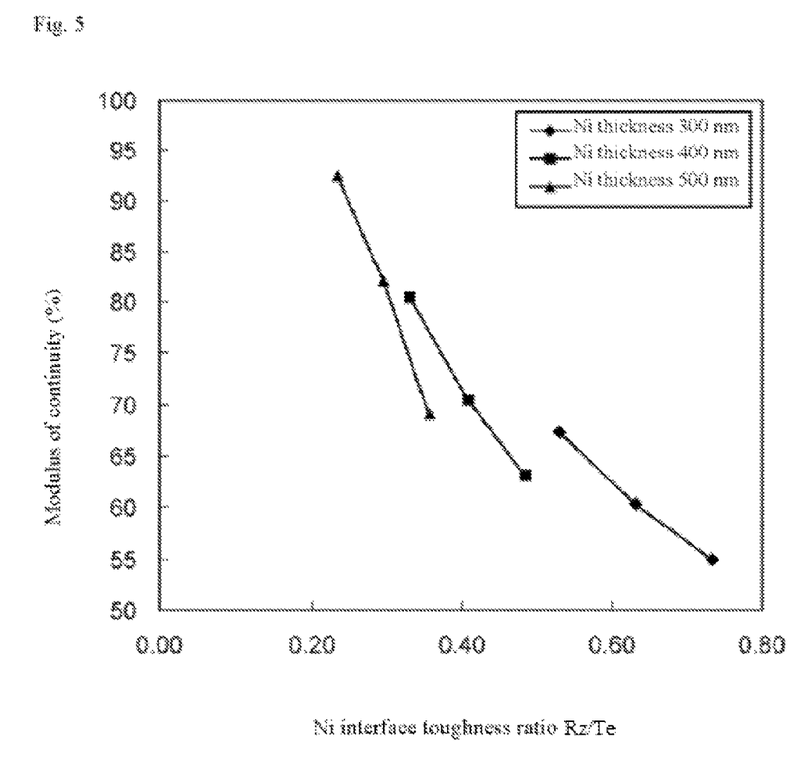
FIG. 5 is a graph showing the relationship of roughness ratio of interface and modulus of continuity of internal electrode layers.

FIG. 5 shows the relationship of the interface roughness ratio (Rz/Te) of the internal electrode layer on one hand, and the modulus of continuity on the other, based on the results in Table 2. It was confirmed that, under the conditions where the interface roughness Rz of the internal electrode layer was one-third the thickness Te or less, the modulus of continuity was 80% or higher and probability of shorting was 10% or lower (refer to Condition Nos. 2 and 11). This indicates that the smoothness of the interface between the dielectric layer and internal electrode layer contributes significantly to improving the coverage of the internal electrode layer.

(3) Condition Nos. 13 to 20

Next, the relationships of the thickness Td of the dielectric layer and thickness Te of the internal electrode layer, and reliability, were examined. Table 3 shows the evaluation results of the samples whose average crystal grain size in the internal electrode layer was 0.08 µm, average grain size of dielectric material powder was 0.10 µm, thickness Td of the dielectric layer varied in a range of 0.60 µm to 1.00 µm, and thickness Te of the internal electrode layer varied in a range of 0.30 µm to 0.50 µm (Condition Nos. 1 and 13 to 20).

TABLE 3

| A | B | | E | | H | I | J | K | L | M |
|---|---|---|---|---|---|---|---|---|---|---|
| | C (µm) | D (µm) | F (µm) | G (µm) | Rz (nm) | Te/Td (—) | Rz/Te (—) | (%) | (%) | (%) |
| *13 | 0.10 | 1.00 | 0.08 | 0.30 | 140 | 0.30 | 0.47 | 73 | 1 | 0 |
| 14 | 0.10 | 1.00 | 0.08 | 0.40 | 120 | 0.40 | 0.30 | 87 | 2 | 0 |
| 1 | 0.10 | 1.00 | 0.08 | 0.50 | 108 | 0.50 | 0.22 | 97 | 2 | 0 |
| *15 | 0.10 | 0.80 | 0.08 | 0.30 | 155 | 0.38 | 0.52 | 69 | 3 | 0 |
| *16 | 0.10 | 0.80 | 0.08 | 0.40 | 135 | 0.50 | 0.34 | 78 | 6 | 0 |
| *17 | 0.10 | 0.80 | 0.08 | 0.50 | 123 | 0.63 | 0.25 | 88 | 13 | 5 |
| *18 | 0.10 | 0.60 | 0.08 | 0.30 | 180 | 0.50 | 0.60 | 63 | 9 | 2 |
| *19 | 0.10 | 0.60 | 0.08 | 0.40 | 160 | 0.67 | 0.40 | 71 | 20 | 6 |
| *20 | 0.10 | 0.60 | 0.08 | 0.50 | 148 | 0.83 | 0.30 | 74 | 33 | 21 |

A: Condition No.;
B: Dielectric layer (BT);
C: Average grain size of powder;
D: Thickness Td;
E: Internal electrode layer (Ni);
F: Average crystal grain size;
G: Thickness Te;
H: Interface roughness;
I: Layer thickness ratio;
J: Roughness ratio;
K: Coverage as modules of continuity;
L: Electrical resistance as probability of shorting;
M: Incidence of structural defects
*indicates a condition producing a result outside the specified range (reference example).

The samples of Condition Nos. 13, 14, and 1 whose thickness Td of the dielectric layer was 1.00 µm and thickness Te of the internal electrode layer was 0.30 µm to 0.50 µm all had a thickness Te of the internal electrode layer corresponding to one-half the thickness Td of the dielectric layer or less (in other words, the layer thickness ratio (Te/Td) was 0.5 or less). The samples of these conditions had an extremely low probability of shorting ranging between 1 and 2%. Especially with the samples of Condition Nos. 1 and 14, the modulus of continuity relating to coverage was also relatively high. However, the modulus of continuity of the sample of Condition No. 13 was 73%, failing to meet the specified value. A high roughness ratio (Rz/Te) of 0.47, rather than the layer thickness ratio (Te/Td), is considered a dominant reason why the modulus of continuity of the sample of Condition No. 13 failed to meet the specified value.

Among the samples of Conditio9n Nos. 15 to 17 whose thickness Td of the dielectric layer was 0.80 µm and thickness Te of the internal electrode layer varied in a range of 0.30 µm to 0.50 µm, the samples of Condition Nos. 15 and 16 whose Te was one-half of Td or less met the probability of shorting of 10% or lower. With the samples of Condition Nos. 15 and 16 whose interface roughness Rz was one-third of Te or more, however, the modulus of continuity failed to meet the specified value of 80% or higher. With the sample of Condition No. 17 whose modulus of continuity was good at 88%, the probability of shorting was outside the specified range at 13% because Te was greater than one-half of Td.

Among the samples of Condition Nos. 18 to 20 whose thickness Td of the dielectric layer was 0.60 µm and thickness Te of the internal electrode layer was 0.30 µm to 0.50 µm, the sample of Condition No. 18 whose Te was one-half of Td met the specified probability of shorting. However, the sample of Condition No. 18 had a high interface roughness ratio (Rz/Te) of 0.60 and the modulus of continuity was 63%, being outside the specified range. The samples of Condition Nos. 19 and 20 whose Te was greater than one-half of Td failed to meet the specified modulus of continuity and probability of shorting and also had relatively many structural defects observed on them.

Figure 6:
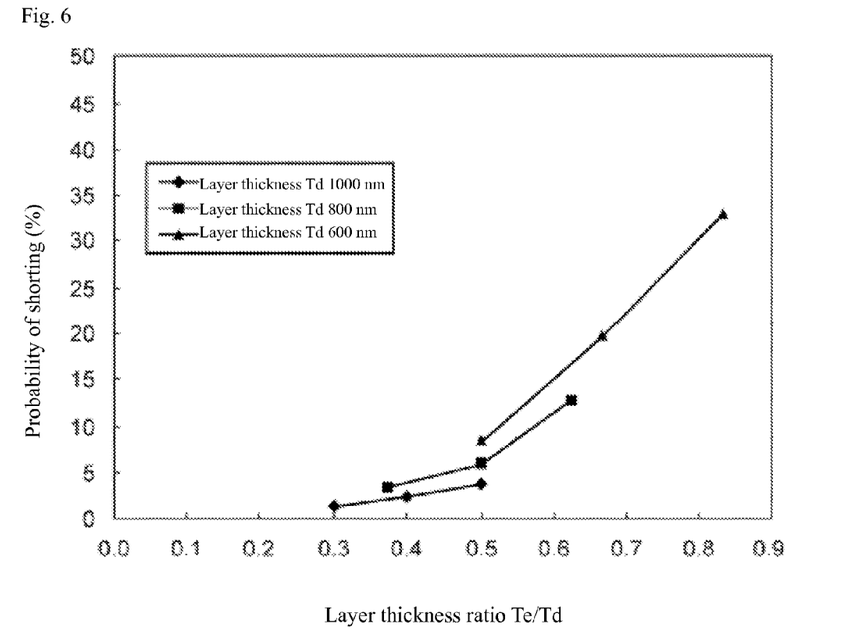
FIG. 6 is a graph showing the relationship of layer thickness ratio and probability of shorting.
Figure 7:
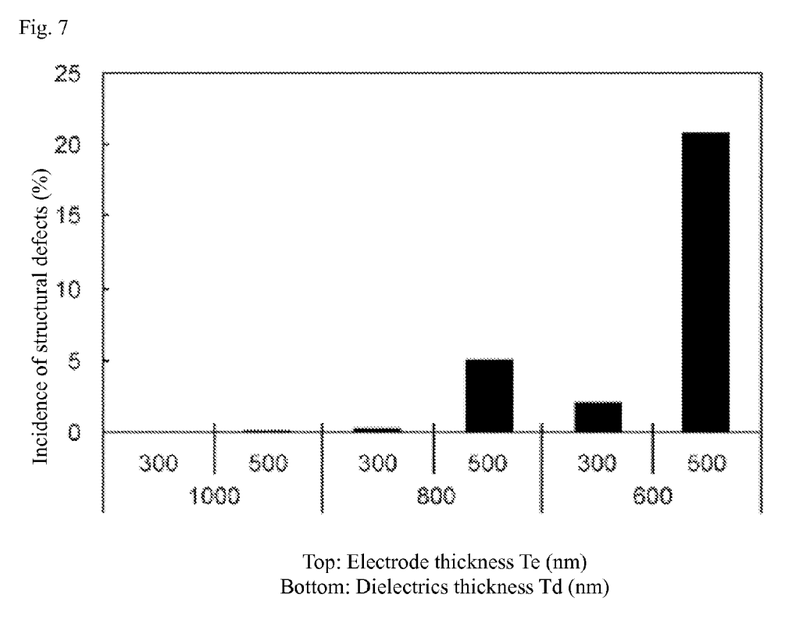
FIG. 7 is a graph showing the relationships of thickness of dielectric layer, thickness of internal electrode layer and incidence of structural defects.

FIG. 6 shows the relationship of layer thickness ratio (Te/Td) and probability of shorting based on the results in Table 3. Also, FIG. 7 shows the relationships of the thickness Td of the dielectric layer, thickness Te of the internal electrode layer, and incidence of structural defects. These figures confirm that a probability of shorting of 10% or lower can be achieved under the condition where the thickness Te of the internal electrode layer is one-half the thickness Td of the dielectric layer or less (refer to Condition Nos. 1, 13 to 16, and 18). Reducing the thickness Te of the internal electrode layer as in the aforementioned conditions would increase the capacitor density and thus contribute to greater capacity. On the other hand, it was also found that the incidence of structural defects would increase as the thickness Te of the internal electrode layer becomes closer to the thickness Td of the dielectric layer (refer to Condition Nos. 17, 19 and 20). In the meantime, it was also confirmed that smoothing the interface roughness Rz of the internal electrode layer would improve the modulus of continuity relating to coverage (refer to Condition Nos. 1, 14, and 17).

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" or "an" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2012-139800, filed Jun. 21, 2012, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A laminated ceramic electronic component having ceramic layers and electrode layers stacked with the ceramic layers, wherein a thickness of each electrode layer is 0.5 μm or less and an average size of crystal grains constituting the electrode layer is 0.1 μm or less, wherein a surface roughness based on a maximum height of an interface between each ceramic layer and each electrode layer is one-third the thickness of the electrode layer or less.

2. A laminated ceramic electronic component according to claim 1, wherein the thickness of the electrode layer is one-half the thickness of the ceramic layer or less.

3. A laminated ceramic electronic component according to claim 2, wherein the thickness of the electrode layer is 0.5 μm or less and 0.4 μm or more.

4. A laminated ceramic electronic component according to claim 1, wherein the thickness of the electrode layer is 0.5 μm or less and 0.4 μm or more.

5. A laminated ceramic electronic component having ceramic layers and electrode layers stacked with the ceramic layers, wherein a thickness of each electrode layer is 0.5 μm or less and an average size of crystal grains constituting the electrode layer is 0.1 μm or less, wherein each electrode layer is comprised of continuous portions and discontinuous portions along an extending direction as viewed in a cross section, wherein the total length of the continuous portions is more than 80% but less than 100% of the length of the electrode layer.

6. A multilayer ceramic capacitor comprising ceramic layers and electrode layers wherein dielectric layers are constituted by ceramic layers alternately stacked with the electrode layers, wherein a thickness of each electrode layer is 0.5 μm or less and an average size of crystal grains constituting the electrode layer is 0.1 μm or less, wherein a surface roughness based on a maximum height of an interface between each dielectric layer and each electrode layer is one-third the thickness of the electrode layer or less.

7. A multilayer ceramic capacitor according to claim 6, wherein the thickness of the electrode layer is one-half the thickness of the dielectric layer or less.

8. A multilayer ceramic capacitor according to claim 6, wherein the thickness of the electrode layer is 0.5 μm or less and 0.4 μm or more.

9. A multilayer ceramic capacitor according to claim 7, wherein the thickness of the electrode layer is 0.5 μm or less and 0.4 μm or more.

10. A multilayer ceramic capacitor comprising ceramic layers and electrode layers wherein dielectric layers are constituted by ceramic layers alternately stacked with the electrode layers, wherein a thickness of each electrode layer is 0.5 μm or less and an average size of crystal grains constituting the electrode layer is 0.1 μm or less, wherein each electrode layer is comprised of continuous portions and discontinuous portions along an extending direction as viewed in a cross section, wherein the total length of the continuous portions is more than 80% but less than 100% of the length of the electrode layer.

* * * * *